United States Patent [19]

Szczepanski

[11] 3,904,526

[45] Sept. 9, 1975

[54] MACHINE FOR RECONDITIONING COATED SPRAY MASKS

[76] Inventor: Harry Szczepanski, 755 Oakleigh, N.W., Grand Rapids, Mich. 49504

[22] Filed: Jan. 26, 1973

[21] Appl. No.: 326,974

[52] U.S. Cl. .............................. 210/196; 210/407
[51] Int. Cl.² .......................................... B01D 35/16
[58] Field of Search ........... 210/167, 359, 407, 194, 210/196; 55/288, 304, 305; 98/115 SB; 209/251, 255, 260, 379, 490

[56] References Cited
UNITED STATES PATENTS

| | | | |
|---|---|---|---|
| 2,414,487 | 1/1947 | Schuttler | 210/359 |
| 3,341,016 | 9/1967 | Paasche | 210/167 X |
| 3,415,181 | 12/1968 | Hart | 210/167 X |
| 3,483,981 | 12/1969 | Gordon | 210/167 |
| 3,651,607 | 3/1972 | Lee | 210/167 X |
| 3,788,475 | 1/1974 | Gould et al. | 210/167 |

FOREIGN PATENTS OR APPLICATIONS

| | | | |
|---|---|---|---|
| 81,029 | 3/1956 | Netherlands | 210/359 |

Primary Examiner—Samih N. Zaharna
Assistant Examiner—Robert H. Spitzer

[57] ABSTRACT

A machine receives and immerses paint-contaminated masks in a cleaning tank preferably containing a solution of a barrier coating material with which the masks had been treated prior to paint-contamination. The solution and tank conditions result in stripping the old coating, together with its impinged paint-contamination, off the masks. Withdrawal of the masks leaves a film of liquid coating material when dried and cooled, which maybe increased by subsequent spray application. Contamination is continuously removed from the liquid in the tank by automatic filtration, thus resulting in exposure of the masks to relatively contamination-free solution. Coating material is thus re-used, and does not require renewal.

13 Claims, 25 Drawing Figures

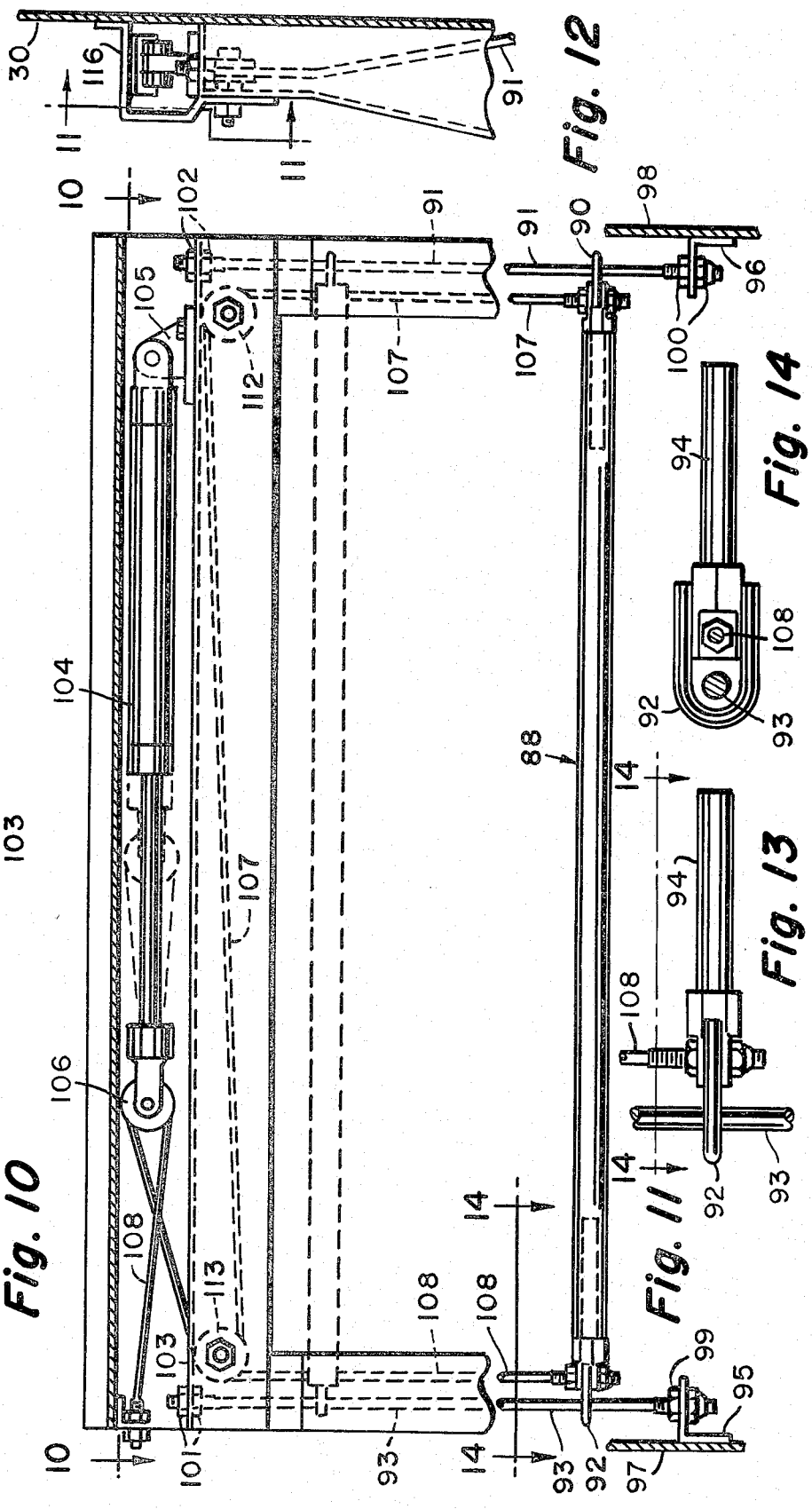

MACHINE FOR RECONDITIONING COATED SPRAY MASKS

BACKGROUND OF THE INVENTION

Industrial painting operations involving high production utilize well-established techniques for applying the paint in the form of a finely-atomized spray. A large percentage of these painting operations involve the application of paint to a fractional part of the production pieces, and it therefore is common practice to "mask" the area of these pieces that are not to receive the sprayed material. The sprayed area is therefore defined by an opening in the mask, and the marginal areas around such openings inevitably accumulated quanties of paint to such an extent that configuration of the opening is distorted. At this point, it becomes necessary to clean the masks so that the original configuration is restored.

The oldest procedure for cleaning these masks is simply the exposure of them to known solvents capable of dissolving accumulated paint. A more recent development now in very substantial use involves the coating of the masks with a barrier film prior to their use in the spray booth, so that the paint particles impinge on this film rather than on the structure of the mask. The cleaning procedure then involves the stripping of the barrier film with its impinged paint contamination, followed by the re-coating of the mask with a new film of protective material. Coating material in current use tend to center in the use of waxy substances that are liquefied by temperatures obtainable in hot water (in the neighborhood of 200° F). The nature of these substances is such that they remain relatively well suspended in the hot water, either as a genuine solution, or in a homogenized condition. Machines for cleaning and reconditioning coated masks have been developed previously, an example being that described in my own application Ser. No. 243,601, filed on Apr. 13, 1972. While these machines fill a definite need, experience with them has established several areas in which improvement is desirable. The effectiveness of the stripping operation itself produces a problem in the continuous removal of the paint-contamination, in order to assure that the masks remain exposed to relatively contamination-free liquid within the stripping tank. This is necessary to assure that the remaining coating film on the masks (as they are removed from the tank) does not itself contain contamination particles.

The importance of a large-volume recirculation of liquid within the tank has been confirmed, together with the need for improved control over the uniformity of the circulation flow in the various portions of the tank. Production usage of this type of equipment has also suggested the need for improving the depth and quality of the recoating of the masks withdrawn from the tank after initial processing. The present invention is directed at these problems.

SUMMARY OF THE INVENTION

An improved filtration system results in maintenance of the liquid within the tank in a relatively contamination-free condition. This system centers in a sling of fabric-like material having a given degree of porosity which will permit the passage of liquid through it, but entrap particles in excess of a predetermined size. The circulation system within the tank causes the entire contents to be continually recirculated through the filtration sling. In this type of procedure, paint contamination is in the form of solid particles, rather than as dissolved material, and a mechanical filtration process is therefore capable of both removing the paint contamination and maintaining the condition of the liquefied coating material for re-use. Arrangements are provided for periodically clearing the filtration sling of entrapped material, and this is preferably done by an automated system operative at each cleaning cycle of the machine. The sling is preferably snapped from a depending loop-condition into a generally vertical position with sufficient force to throw particles from the sling over onto a receiving panel associated with a collection receptacle.

The circulation pattern of the liquid induced within the tank results in a tendency to isolate the liquid flow from the open ends of the filtration sling, so that barrier plates positioned in general proximity to the ends of the sling are adequate to confine the particulate contamination to the sling, rather than permitting it to escape at the end.

The carrier for moving the masks to and from the immersed condition is provided with a retaining grid preventing the accidental dropping of masks into the hot contents of the tank, and the movement of the carrier as it withdraws the masks from immersed condition preferably utilized to place the masks opposite a set of spray guns adapted to apply subsequent reinforcement to the coating of the masks.

The uniformity of circulation and concentration conditions throughout the tank is improved considerably by the construction of a discharge manifold supplied by a high-volume pump, the primary function of the manifold being to distribute its flow evenly across one side of the tank, and directing it toward the opposite side with as small a velocity gradient along the length of the tank as possible. The construction of this manifold is such as to provide a degree of adjustability so that local conditions of circulation velocity can be increased or diminished to make sure conditions approached more closely to the desired average.

DESCRIPTION OF THE DRAWINGS

FIG. 10 is a section on the plane 10—10 of FIG. 11.

FIG. 11 is a section on the plane 11—11 of FIG. 12.

FIG. 12 is a section on a vertical plane at the rear portion of the machine, illustrating the actuating mechanism for the filtration system.

FIG. 13 is a fragmentary elevation on an enlarged scale, showing the interengagement of the rod assembly supporting one side of the filter sling with its associated guideway structure.

FIG. 14 is a section on the plane 14—14 of FIG. 13.

DESCRIPTION OF THE PREFERRED EMOBIMENTS

Figure 1:
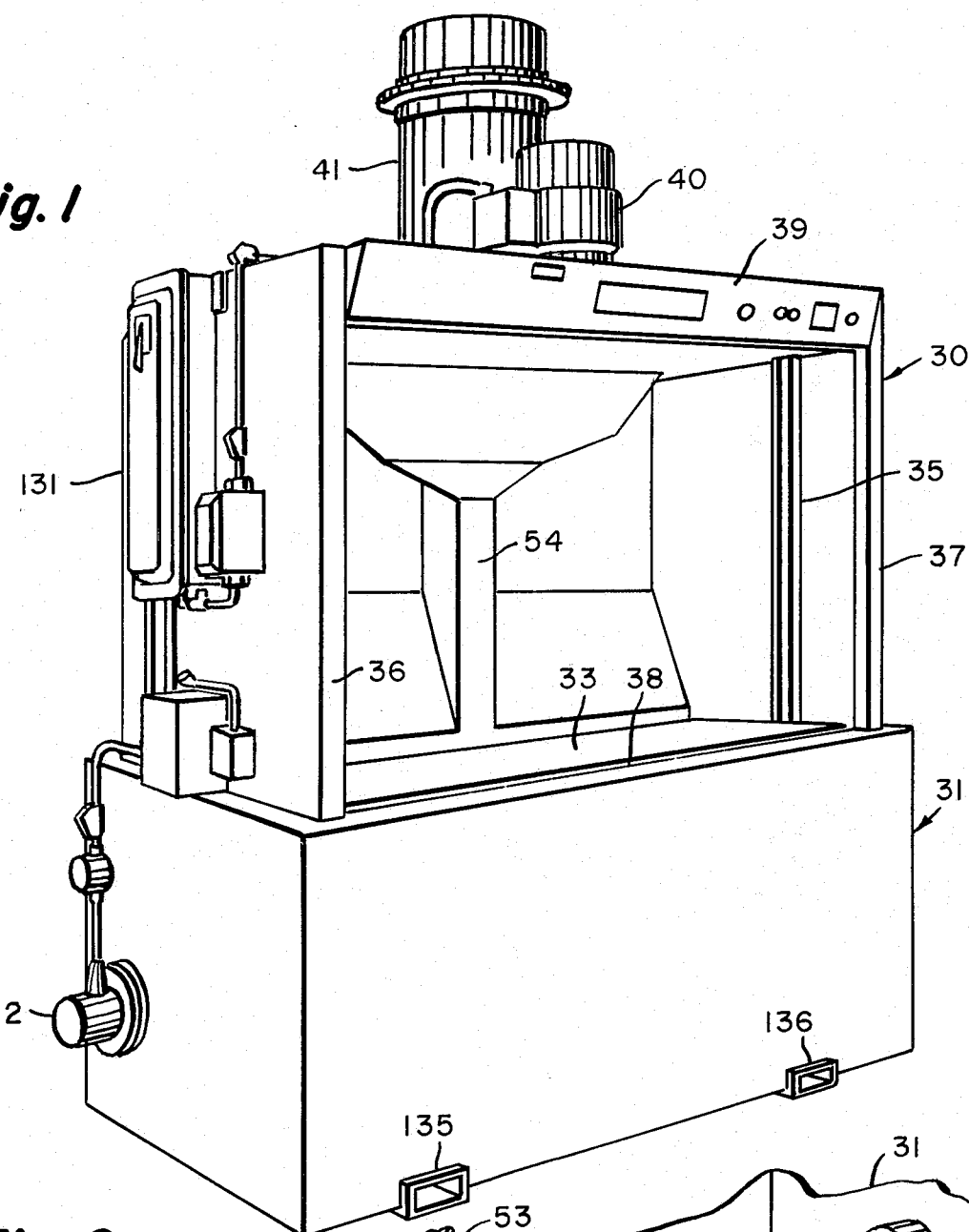
FIG. 1 is a frontal perspective view of a complete machine embodying the present invention.
Figure 3:
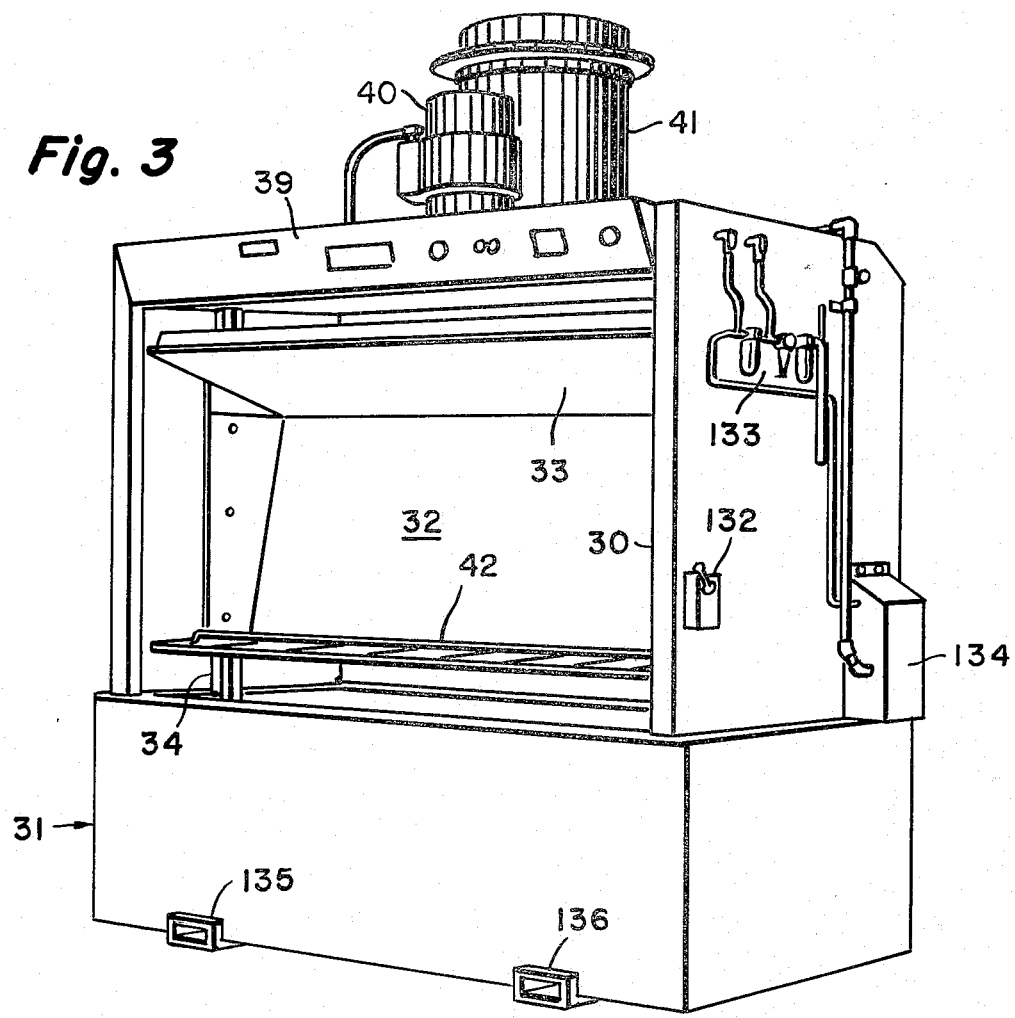
FIG. 3 is a frontal perspective view from the opposite quarter of that of FIG. 1.

The machine shown in FIG. 1 and the related views includes a housing indicated at 30 mounted on top of a tank structure 31. In FIG. 1, the components of the machine are in the cleaning position in which masks have been immersed in the tank 31 for processing. FIG. 3 illustrates the machine in the loading-unloading position, in which the mask carrier 32 is shown elevated out of the tank, and the cover 33 raised to permit the emergence of the carrier 32. The path of movement of the carrier is determined by the guideways 34 and 35. The housing 30 defines a front opening between the vertical front edge members 36 and 37, and between the top front edge 38 of the tank and the control panel 39. This control panel preferably contains a number of controls and instruments to indicate and determine the condition and the functioning of the various components of the machine. A motor 40 drives a suction fan (not shown) mounted in the exhaust pipe 41 in a standard arrangement preferably involving the passage of appropriate power-transfer belts through suitable openings in the pipe 41.

A cycle of operation of the machine might be considered to begin with the machine in the FIG. 3 position. A contaminated mask is placed on the carrier 32, and the presence of the grille 42 prevents the accidental dropping of the mask into the hot solution in the tank 31 during the unloading and loading procedures. The grille 42 extends from the carrier 32 over to a position adjacent the front wall structure of the tank 31. At the time of placement of the masks in the position indicated at 43, the components of the machine are in the position shown in FIG. 16. The masks lean against the plate 44, with the lower edges retained by the stop rail 45. The plate 44 and the lower reinforcing beam structure generally indicated at 46 extend between the opposite flange plates 47 secured to follower structure as indicated at 48 interengaged with the guideways 34 and 35. The cover 33 is pivotally mounted on the follower structure 48 in a manner such that the center of gravity establishes a tendency for the cover to rotate in a clockwise direction as viewed in FIG. 16. This rotation is limited by the interengagement of the cover with the upper portion of the plate 44, with the result that at the beginning of the upward movement of the carrier out of the tank will be accompanied by a rotation of the cover from the horizontal sealing position shown in FIG. 15 to the rotated position shown in FIG. 16. This arrangement induces drainage of droplets accumulated on the cover back into the tank, rather than in the area where it can impinge on masks and the hands or clothing of the operator.

Figure 15:
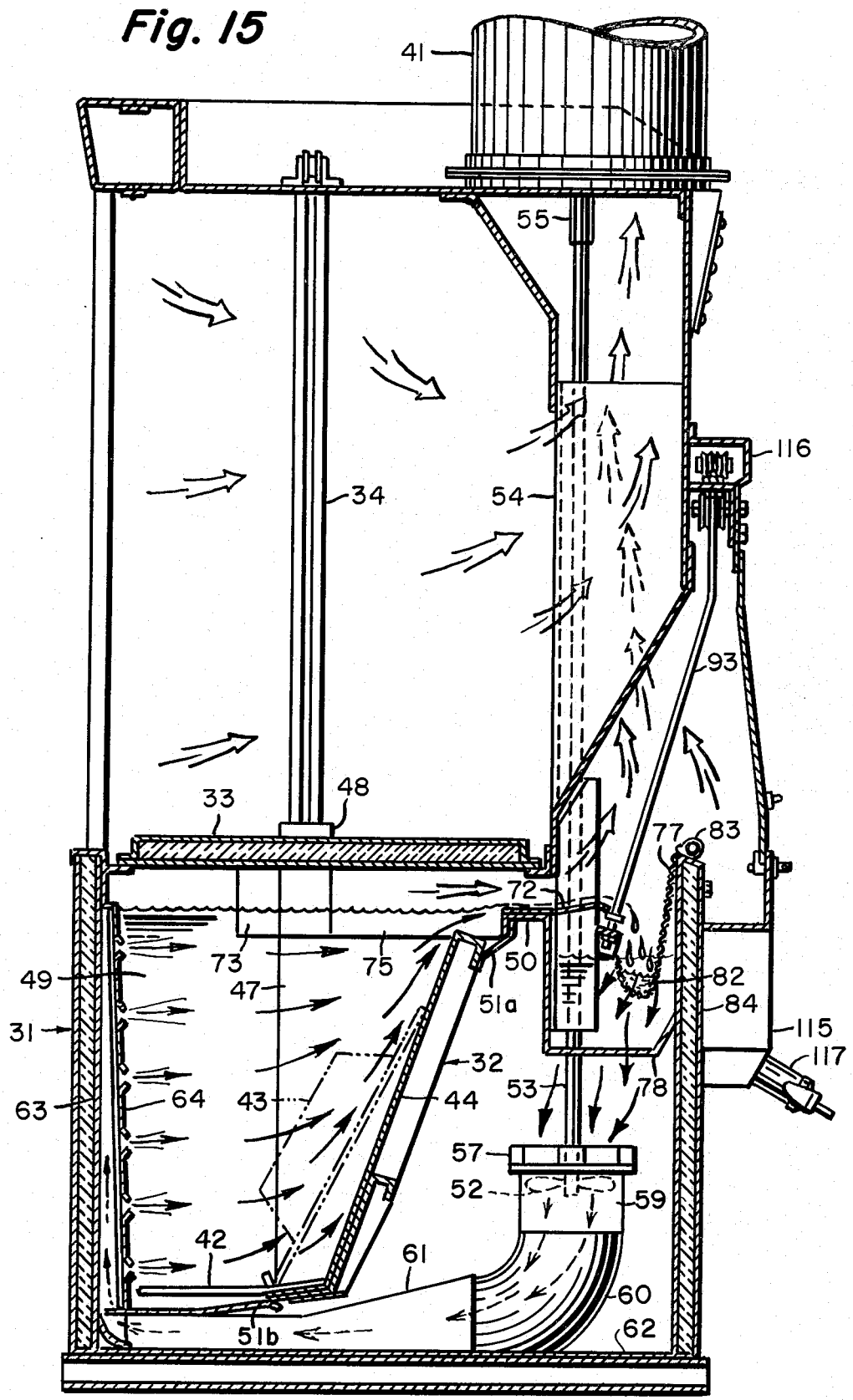
FIG. 15 is a section on a vertical plane through the central portion of the machine, in side elevation, with the machine components in positions corresponding to the cleaning operation being in process.
Figure 16:
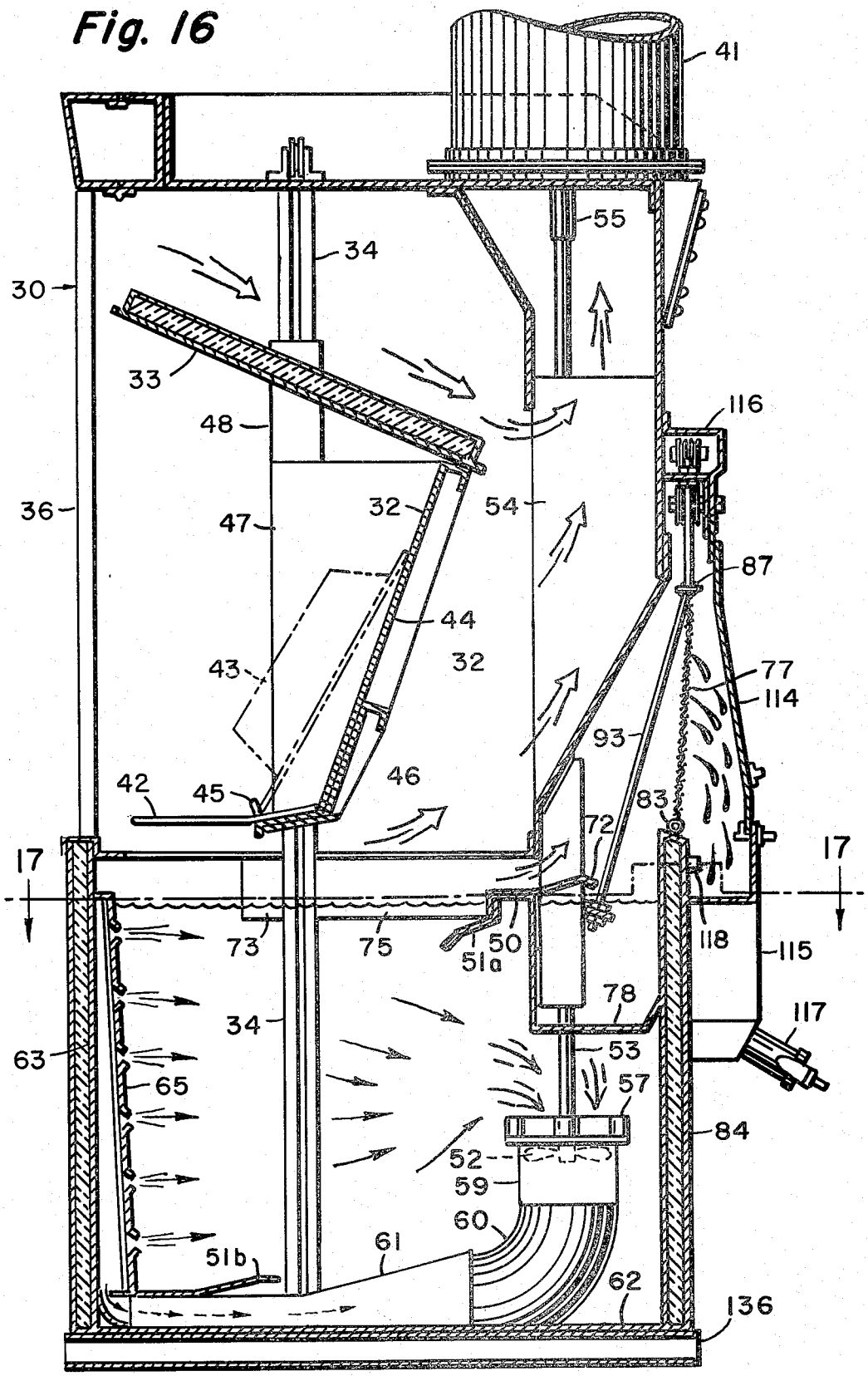
FIG. 16 is a section similar to FIG. 15, but with the components of the machine in positions corresponding to the removal of the mask carrier from the tank, and the actuation of the purging portion of the filtration system.

Initiation of the cleaning cycle of the machine by appropriate manipulation of the controls results in the movement of the components from the FIG. 16 to the FIG. 15 position. Masks 43 are thus subject to the liquid indicated at 49 within the tank 31. In the lowered position of the carrier 32, the plate 44 functions as a partition extending from one side of the tank to the other, acting in conjunction with the transverse beam 50, the upper flexible sealing strip 51a, and the lower sealing strip 51b.

A circulation of liquid within the tank 31 is maintained by the rotation of the pump propellor 52 mounted on the shaft 53, which extends vertically through the duct 54 to the coupling 55 connected coaxially with the shaft (not shown) of the exhaust fan within the pipe 41. The shaft 53 is supported at a position adjacent the propellor 52 by the bearing 56 supported by the radial arms of the star-shaped bracket 57 best shown in FIG. 2. This bracket is secured to the flange 58 of the cylindrical collar 59, which is in turn secured to the elbow 60 attached to the diverging duct 61 mounted on the floor 62 of the tank 31. Rotation of the shaft 53 carries the propellor 52 with it, and drives liquid within the collar 59 downward through the elbow 60 and the duct 61. Water enters from the portion of the tank behind the panel 44 through the openings between the legs of the bracket 57.

Figure 18:
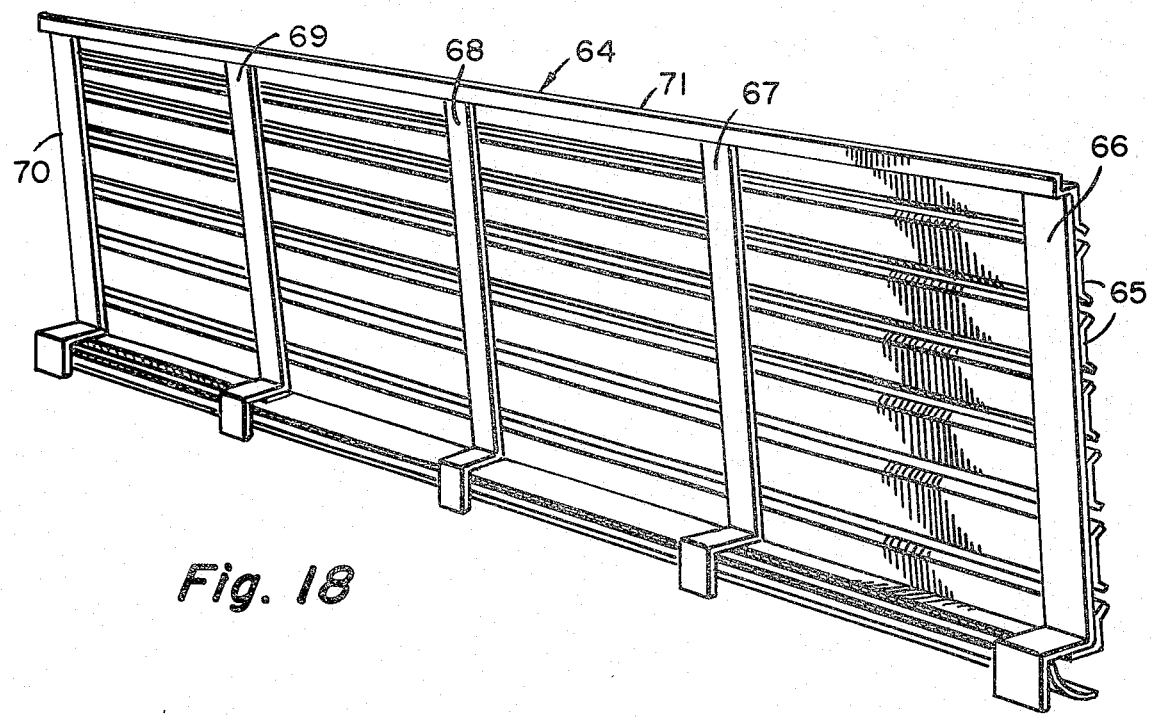
FIG. 18 is a perspective frontal view of the structure defining the inner wall of the distribution manifold adjacent the front wall of the tank.
Figure 19:
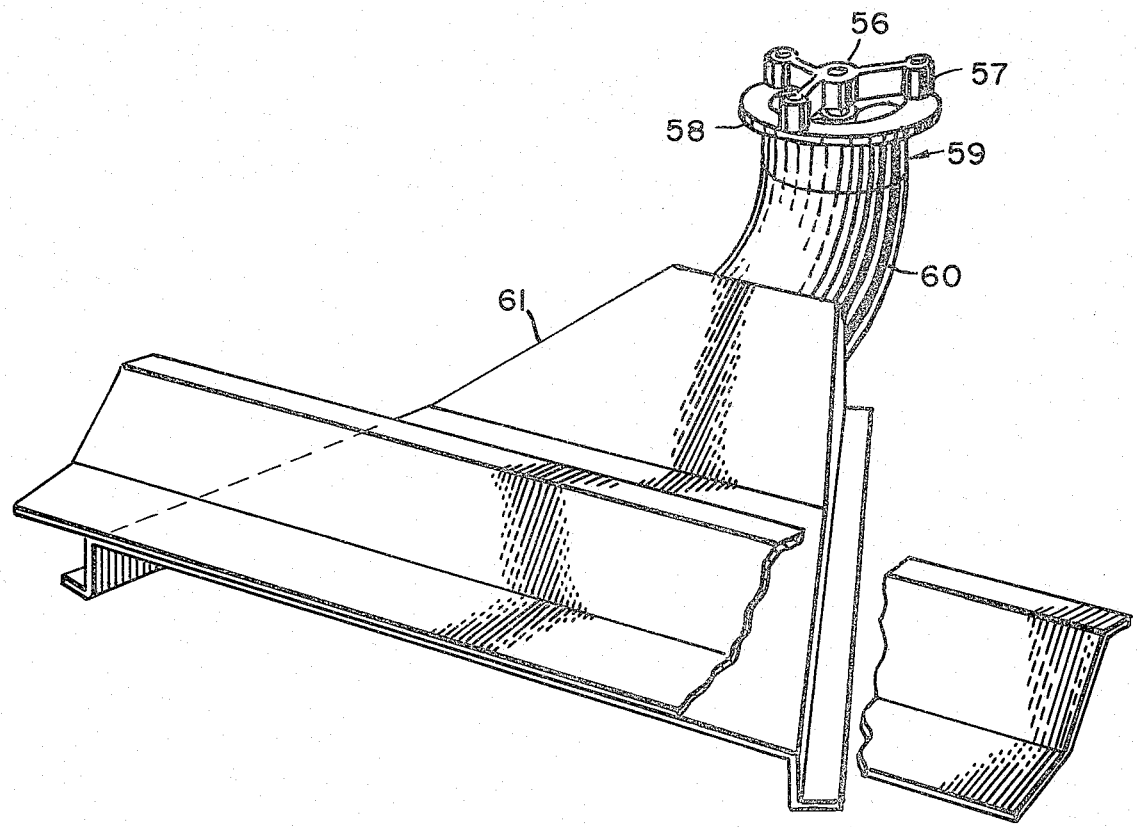
FIG. 19 is a perspective view showing the duct system extending from the pump to the distribution manifold shown in FIG. 18.
Figure 20:
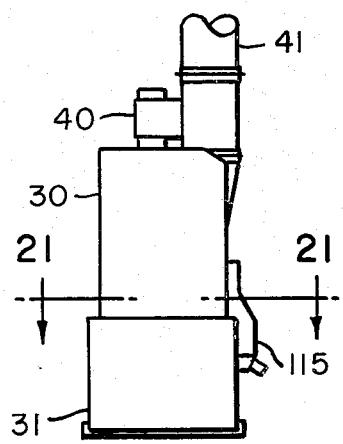
FIG. 20 is a side elevation of the complete machine.
Figure 21:
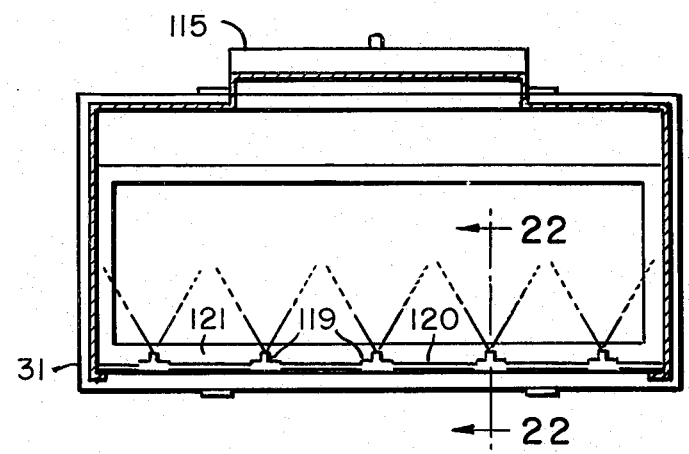
FIG. 21 is a view on the plane 21—21 of FIG. 20 on an enlarged scale.

Liquid flowing toward the front of the machine through the divergent duct 61 enters the space between the front wall structure 63 of the tank and the assembly of vertically-spaced slats indicated generally at 64, and shown in FIG. 18. The space between the walls 63 and the assembly 64 constitutes a distribution manifold for moving the water out laterally from the duct 51, and establishing points of discharge between the slats for inducing a uniform movement from front to rear of the water toward the mask carrier 32. Each of the slats indicated at 65 is channel-shaped in configuration (in cross section). These slats are preferably made of a relatively thin guage of steel, which permits the flanges to be deformed by suitable tools to increase or narrow the gap between the slats, and thus control the local velocity of discharge at that point. The backs of the slats are secured to the vertical members 66–70, which extend from the bottom 62 of the tank to the top rail 71 secured to the front wall 63.

Figure 17:
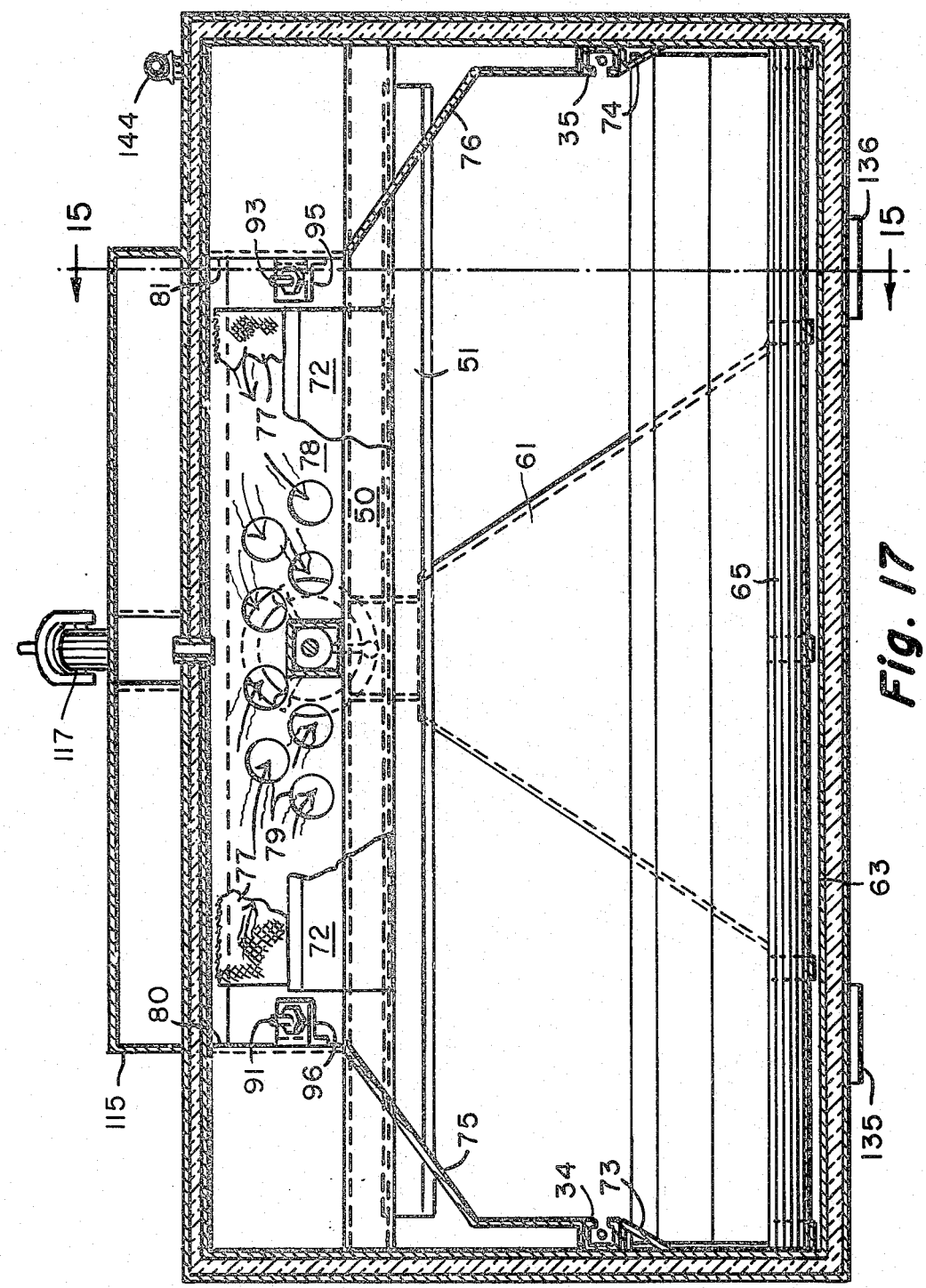
FIG. 17 is a section on the plane 17—17 of FIG. 16.

Water emerging from the gaps between the slats 65 moves to the rear across the tank, as shown by the discharge arrows in FIGS. 15 and 16. This circulation flow impinges on the masks supported by the carrier 32, and moves upward across the dam or partition provided by the plate 44. All of this circulation is carried by overflow proceeding above the beam 50, and supported by the carrier plate 72. This flow is guided near the opposite ends of the tank by the deflector plates 73–74, which assist in establishing a uniform flow across the gap in the guideways 34 and 35. The rear deflectors 75 and 76 produce a converging action to the flow toward the central part of the machine, to where it passes over the carrier plate 72. This plate extends to the rear to form an eave carrying the water over to a point where it can drop over the edge of the filter sling 77 into the depending loop configuration appearing in FIG. 15. The material of the filter sling 77 is preferably an initially flat fabric-like sheet selected to provide a degree of porosity such that liquid flows through it readily, and yet particles in excess of the predetermined size are retained. Liquid flowing through the material of the filter sling proceeds downward into the trough 78, the bottom of which has a group of holes 79 providing drainage back into the tank. These holes are grouped centrally with respect to the trough 78 (as shown in FIG. 17). This arrangement tends to draw the flow of liquid toward the central portion of the single-curvature depending position of the filter sling 77, and thus inhibit any tendency for the liquid to flow around the ends of the sling. The end plates 80 and 81 of the trough 78 form barriers further confining the flow of liquid. It is not necessary, however, to maintain the ends of the filter sling in wiping contact with these end plates, as the centralized out-flow induced by the presence of the drainage holes 79 makes the accumulating of contaminant particles in the filter sling localized in the central area in the position indicated at 82 in FIG. 15.

Figures 8, 9:
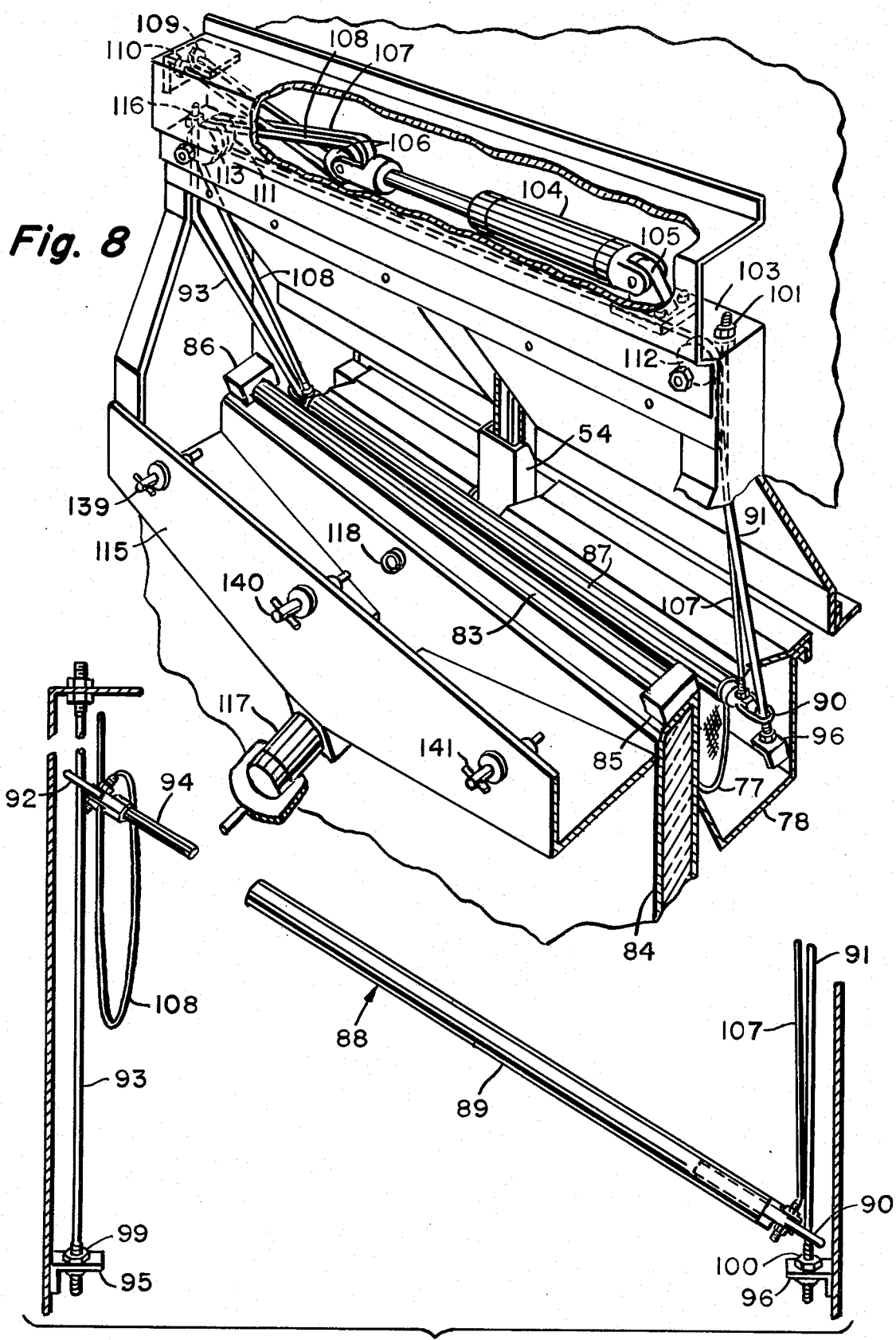
FIG. 8 is a fragmentary rear perspective view showing the actuation mechanism for the filtration system.
FIG. 9 is a view in rear elevation showing the disengagement position of the rod assembly supporting one side of the filter sling.

The edge of the sling indicated at 83 may be considered as fixed with respect to the rear wall 84 of the tank. This portion of the sling is wrapped around a rod 85 (refer to FIG. 8), which is held in place at its opposite ends by retaining blocks as shown at 86. The opposite edge of the filter sling is indicated at 87, and is formed into a loop receiving a moveable rod assembly 88 shown best in FIGS. 9, 11, 13 and 14. The rod assembly 88 has a tubular section 89 having a fitting at one end providing the loop 90 interengaged with the guide rod 91. At the opposite end of the assembly, a similar fitting provides a loop 92 interengaged with the guide rod 93. The fitting 92 has a projection 94 telescopically received within the tube 89 in a relatively free fit, with the result that the filter sling can be interengaged with the rod assembly 88 with the procedure shown in FIG. 9. Placement of the assembly in the illustrated diagonal position permits disengagement of the projection 94 so that the edge loop of the filter sling can be inserted and removed. The lower extremities of the guide rods 93 and 94 are secured to the brackets 95 and 96, respectively, mounted on the vertical panels 97 and 98 of the housing. The attachment is preferably by nuts as shown at 99 and 100 interengaged with threaded portions at the end of these rods. The upper extremities of these guide rods are similarly secured by the nuts as shown at 101 and 102 on the opposite sides of the housing panel 103 traversed by the rods. This panel also forms a mounting base for the hydraulic actuator assembly indicated generally at 104 responsible for movement of the filter sling from the FIG. 15 position to the position shown in FIG. 16. The piston-cylinder actuator 104 is pivotally secured to the bracket 105 mounted on the panel 103, and the opposite end of the unit carries the double pulley assembly 106. Cables 107 and 108 are looped around these pulleys, with the ends being respectively connecting to the terminals 109 and 110. The cable 107 extends from the idler pulley 111 across the machine to the opposite idler pulley 112, and from there to a point of connection to the rod assembly 88. The cable 108 proceeds around the idler pulley 113, and from there directly down to the point of connection to the opposite side of the rod assembly 88. A shortening of the actuator 104 by application of fluid or liquid pressure will thus tend to raise the filter screen to the FIG. 16 position at a rate twice that of the shortening of the actuator. Both sides of the filter sling are obviously raised at the same rate. Preferably, the raising action is conducted at a sufficiently rapid rate to produce a snapping action when the filter sling arrives at the FIG. 16 position, throwing entrapped particles over onto the panel 114 forming an upward extension of the rear wall of the receptacle 115. The actuator 104 is provided with pressure through conventional conduits (104 a–b), and a protective hood 116 is preferably added to protect the actuating mechanism from accidental damage from outside influences. Th receptacle 115 extends to the rear wall 84 supporting the fixed edge of the filter sling, which facilitates the dumping action resulting from the FIG. 16 position of the sling. The receptacle 115 has a funnel-shaped bottom configuration drawing sludge and other contaminants toward the central area adjacent the drain valve 117. The contents of the receptacle 115 can be dumped without disturbing the cyclical operation of the machine. Preferably, these cycles of operation are controlled automatically by conventional equipment installed behind the instrument panel 39, and these predetermined cycles will normally include an actuation of the dumping movement of the filter sling each time the mask carrier goes through its cycle of movement into and out of the tank. In the event that the operator of the machine does not dump the contents of the receptacle 115 frequently enough to keep the liquid level substantially below the trough capacity, an overflow drain 118 is installed at a position near the top of the trough, so that the trough can function as a settling basin accumulating particles in its lower area, and permitting liquid to drain back through the conduit 118 into the tank via the trough 78.

Figure 22:
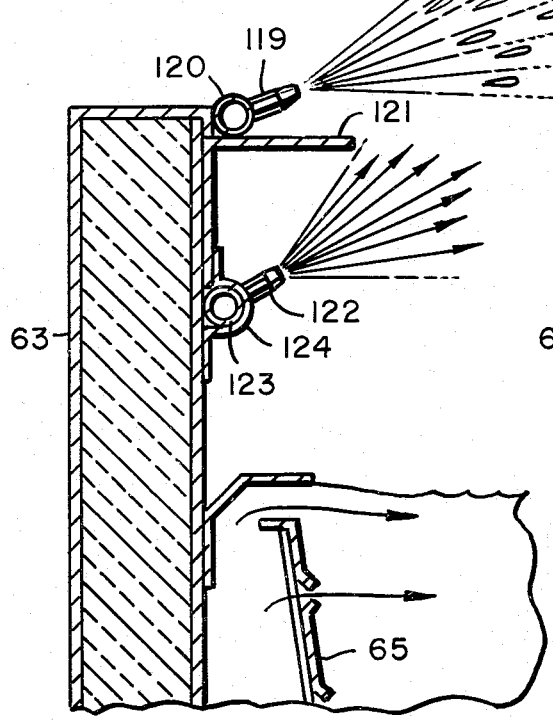
FIG. 22 is a section on an enlarged scale on the plane 22—22 of FIG. 21.
Figure 23:
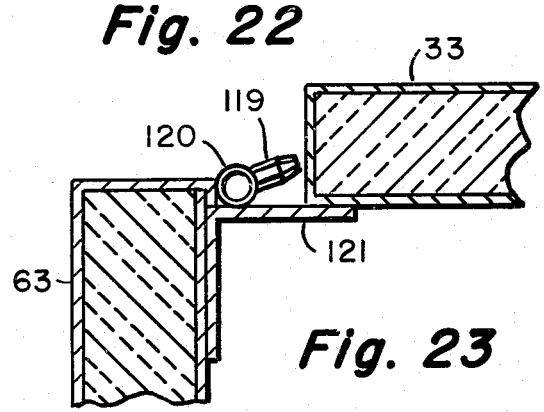
FIG. 23 is a section of the upper portion of the structure shown in FIG. 22, with the cover of the machine in the closed position to illustrate the relationship of the cover and the upper nozzles.

Masks emerging from the tank will naturally retain a coating of liquid, which will dry to a solid coating after a few moments of exposure to the ventilation flow pattern shown in FIG. 16. This coating may be increased in depth by the arrangements shown in FIGS. 21 through 25. A row of spray nozzles 119 are fed by the conduit 120 mounted on the shelf 121 providing a closure surface for the cover 33. The nozzles 119 may be oriented to project spray against the masks in the position shown at 43 in FIG. 16, or the nozzles may be directed along a somewhat lower line of impingement traversed by the masks as they are moved into the fully elevated position. The spray should be applied in a quantity and at a temperature insufficient to remove the initial coating. Preferably, the spray guns 119 are energized after a sufficient lapse of time following withdrawal of the masks from the tank to permit the retained liquid to dry to form the first phase of the coating. The drying may be further facilitated by the presence of a second row of nozzles indicated at 122, which are supplied by the air conduit 123 secured to the wall of a tank by brackets shown at 124 in FIG. 22. The discharge of a blast of hot air from the nozzles 122 can be cyclically interrelated with the withdrawal of the masks from the tank, and also with the discharge of the guns 119, to facilitate both stages of the drying operation. FIG. 23 shows the upper portion of the structure illustrated in FIG. 22, with the cover 33 of the tank in closed position. Provision must be made for clearance between the edge of the cover 33 and the assembly of guns 119 to assure that no interference exists between these components.

Figure 24:
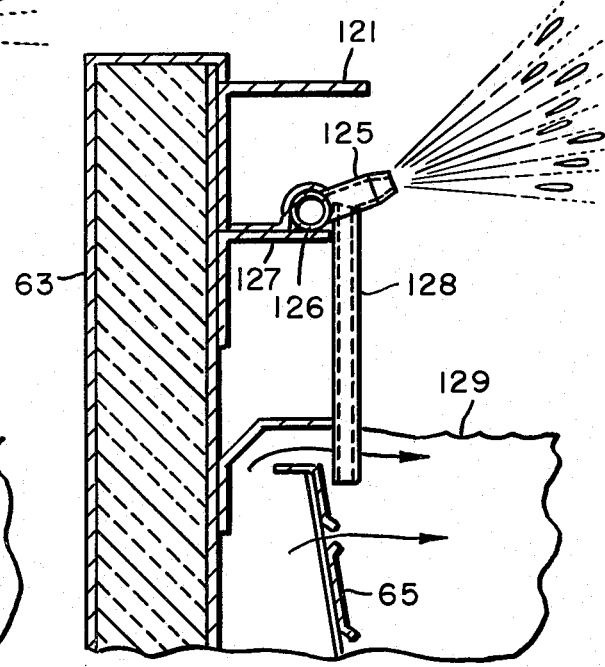
FIG. 24 is a sectional view similar in position to that of FIGS. 22 and 23, illustrating a modified form of the invention with respect to the spray system.
Figure 25:
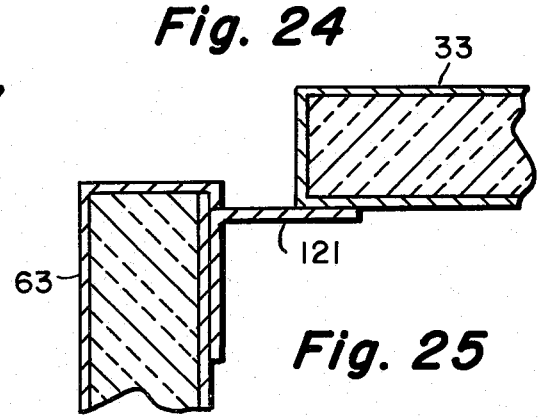
FIG. 25 is a view of the closed position of the cover and the upper portion of the structure shown in FIG. 24.

FIGS. 24 and 25 illustrate a modified arrangement for providing a supplemental coating. The spray guns 125 are connected to an air conduit 126 mounted on the shelf 127 secured to the front wall of the tank. Aspirator tubes as shown at 128 extend from each of the guns 125 downward to a position below the level 129 of liquid within the tank, so that this liquid forms a source of supply for the secondary spray operation. The masks are thus re-treated with the same solution that they were originally immersed in. The FIG. 22 arrangement is adapted to the use of either a different solution for spraying purposes from that originally in the tank, or to a more concentrated form of the same solution. The FIG. 24 arrangement, however, will result in a re-application of liquid that becomes practical because of the continuous purging of contamination being swept to the rear of the tank by the circulation flow, and removed by the filter sling arrangement.

Figure 2:
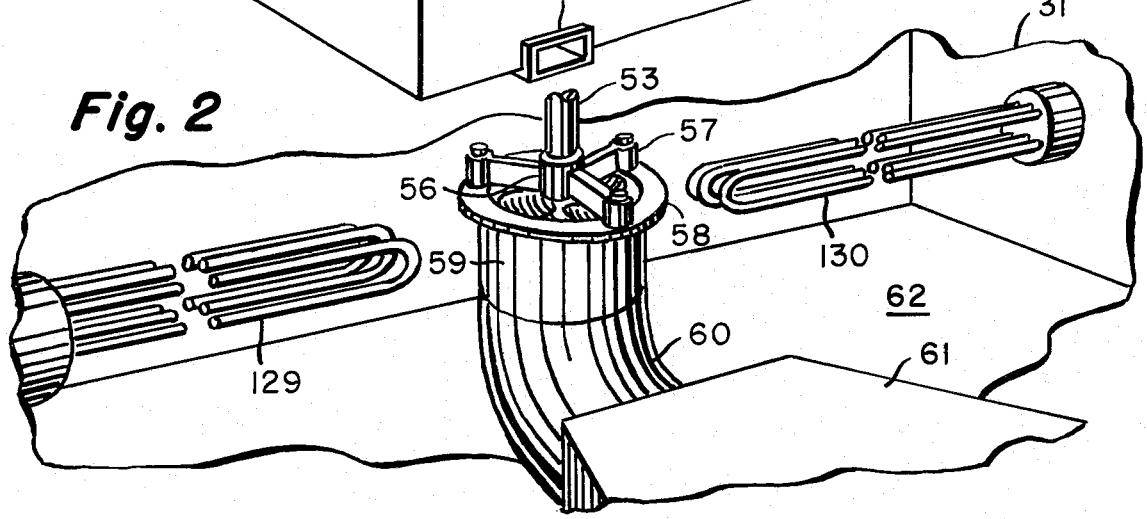
FIG. 2 is a fragmentary view on an enlarged scale over that of FIG. 1 of the lower portion of the inside of the machine, as viewed in frontal perspective, illustrating the heating units and the fluid pump structure.
Figure 4:
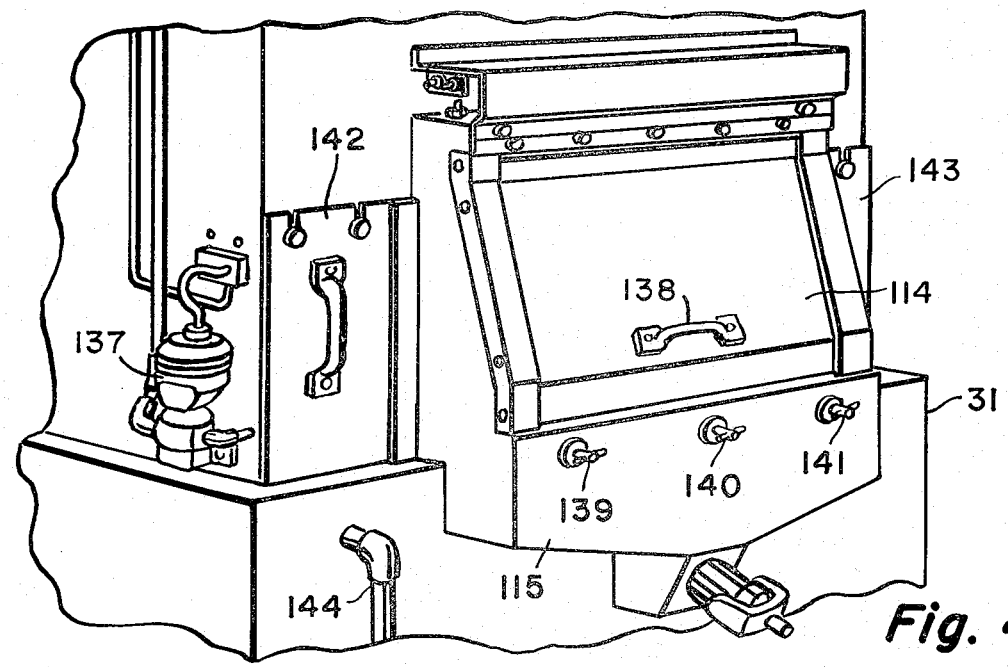
FIG. 4 is a fragmentary rear perspective view of the machine.
Figure 5:
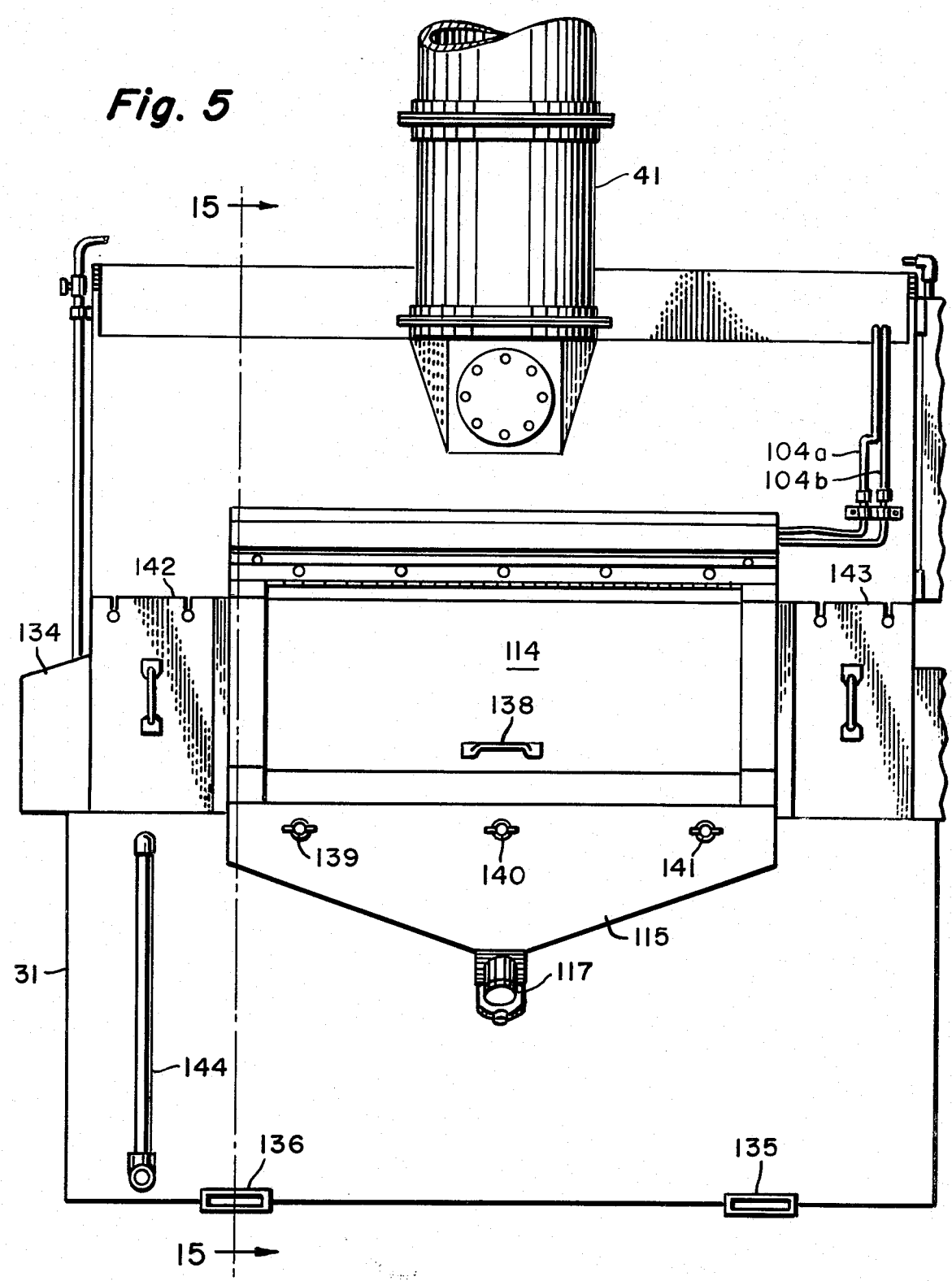
FIG. 5 is a rear elevation of the complete machine shown in FIG. 1.
Figure 6:
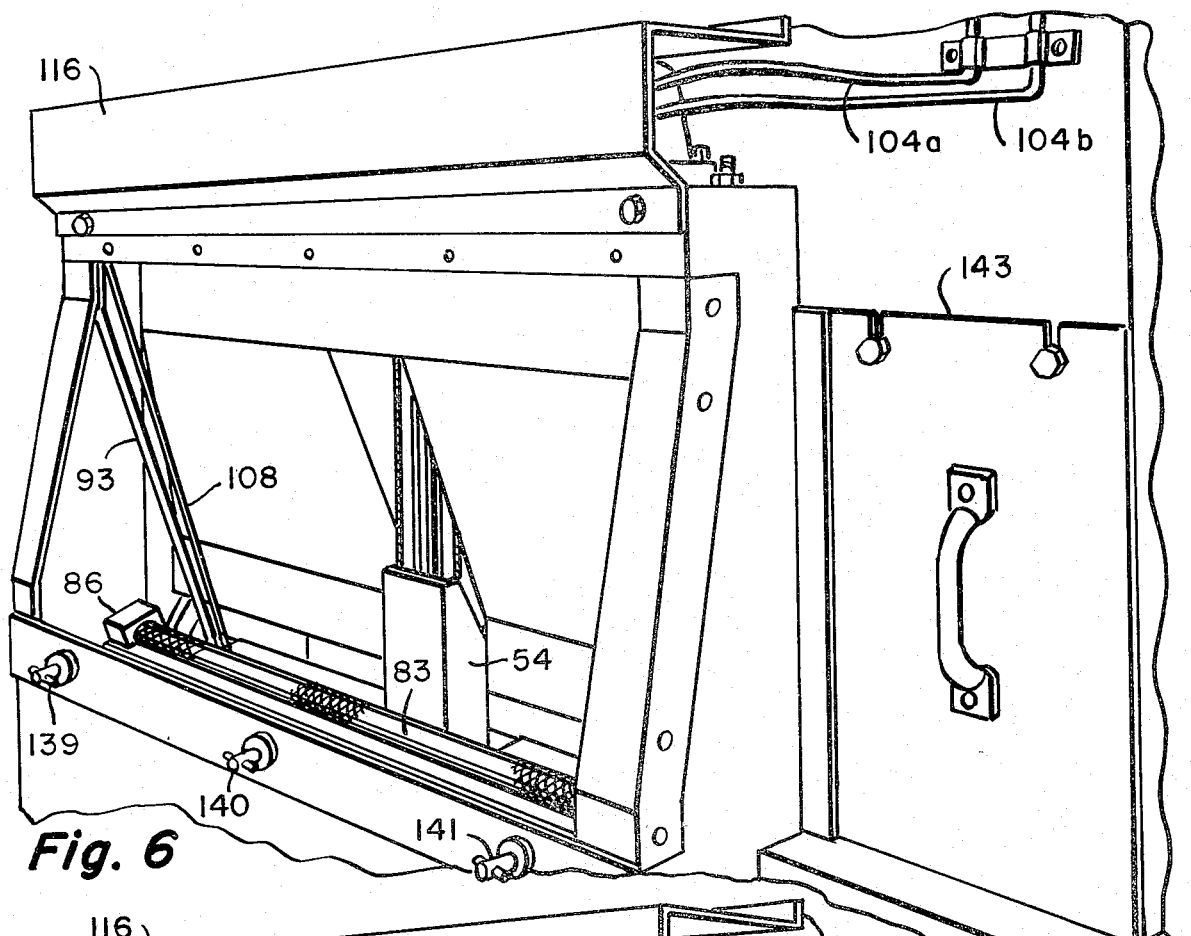
FIG. 6 is a perspective rear quarter view of a portion of the machine, showing the access panel removed from the area opposite the filtration system.
Figure 7:
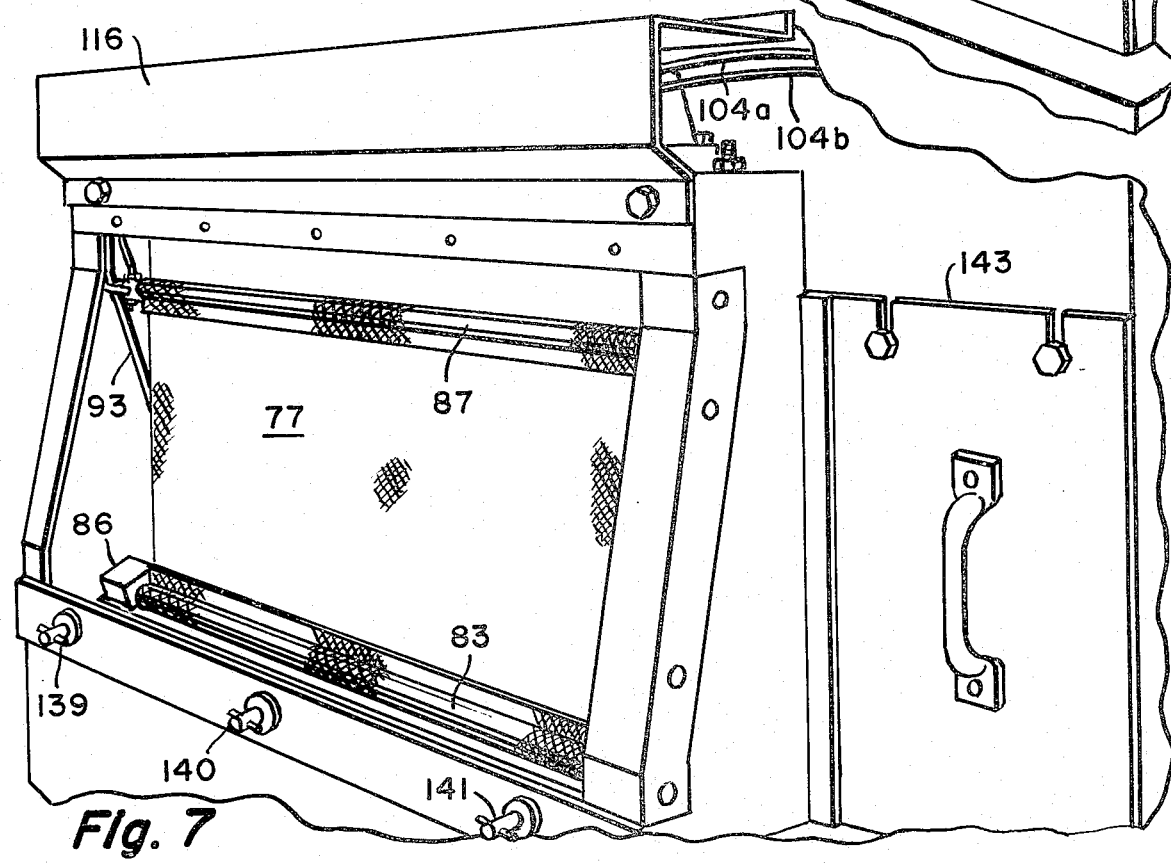
FIG. 7 is a view similar to FIG. 6, with the filtration system being in the purging condition.

The handling of masks involving coating materials usually requires the use of elevated temperatures within the tank 31. Heat may be added to the liquid in a number of conventional ways. FIG. 2 illustrates the preferred position of electrical heating elements indicated at 129 and 130. These could be replaced conceivably by steam coils, or other heat-exchanger arrangements. Equipment mounted on the exterior of the machine includes the electrical controls 131, and the exterior structure 132 associated with the heating coil 129. The opposite side of the machine shown in FIG. 3 illustrates the placement of the emergency shut-off switch 132 and a gauge panel 133. The small housing 134 contains the mechanism of a conventional automatic liquid-level control. The rectangular beams 135 and 136 form ground supports, and points of access for the forks of a lift truck to facilitate moving and placement of the machine. FIG. 4 shows the rear of the machine, with the housing 134 removed exposing the control mechanism 137. The panel 114 is provided with the handle 138 to form an access door swinging inwardly opposite the filter sling for inspection and servicing in that area. Fasteners as indicated at 139-141 may be used to hold the panel 114 firmly against the outer wall of the receptacle 115 to prevent leakage. Access panels 142 and 143 are removably mounted for access to the corner portions of the tank. The piping indicated at 144 is preferably incorporated as an overflow point for the tank in the event of malfunction of the automatic control system 137.

I claim:

1. A cleaning machine including a tank having partition means with an elongated horizontal upper edge, and liquid-circulating means operative to induce a flow of liquid from one side of said partition to the other side thereof at a level substantially below the top of said partition, said flow returning over said top edge, wherein the improvement comprises:

a filter formed of a liquid permeable flexible material having opposed side edges;

first means securing one of said side edges in laterally-spaced relationship to said partition; and second means securing the other of said side edges in spaced relation to said first means whereby said filter between said first and second securing means normally depends into sling configuration and is disposed to receive liquid flow passing over said upper edge, said second means being constructed and arranged to be movable relative to said first means to elevate said other of said side edges for cleaning purposes.

2. A machine as defined in claim 1 additionally including a liquid carrying plate providing an eave portion along said upper edge and normally overhanging one of said edges of said filter.

3. A machine as defined in claim 1, wherein said filter is a sheet of single curvature.

4. A machine as defined in claim 1, wherein said partition edge is the top thereof, and said returning flow is overflow at said edge.

5. A machine as defined in claim 1, additionally including trough means disposed between said partition portion and said receptacle, and normally receiving said filter, said trough having liquid-return means for conducting liquid passing through said filter back to said tank.

6. A machine as defined in claim 5, wherein said liquid-return means is disposed exclusively in the central portion of said trough means, thereby inhibiting flow toward the ends of said filter.

7. A cleaning machine including a tank having partition means with an elongated horizontal upper edge, and liquid-circulating means operative to induce a flow of liquid from one side of said partition to the other side thereof at a level substantially below the top of said partition, said flow returning over said upper edge, wherein the improvement comprises:

a filter sling having one portion thereof secured in laterally-spaced relationship to said partition, said filter sling normally depending into sling configuration and being disposed to receive liquid flow passing over said upper edge;

terminal means secured to said filter sling; and guide means for said terminal means establishing a path of movement of said terminal means from a lowered position placing said filter sling in position to receive said liquid flow passing over said partition upper edge to an elevated position raising one side of said filter sling.

8. A machine as defined in claim 7, wherein said terminal means is an elongated member normally interengaged with said filter sling, the opposite ends of said member being interengaged with said guide means.

9. A machine as defined in claim 8, wherein said filter sling has a loop normally receiving said elongated member, and said member has axially disengageable sections permitting insertion and removal of said loop.

10. A machine as defined in claim 7, additionally including a receptacle on the opposite side of said filter sling from said partition, and further including elevating means operative to raise said terminal means to dump the contents of said filter sling into said said receptacle.

11. A machine as defined in claim 10, wherein said filter sling is secured to the edge of said receptacle adjacent said partition.

12. A machine as defined in claim 10, additionally including a panel extending upwardly from the side of said receptacle remote from said filter sling, said elevating means being operative to extend said filter sling upwardly to apply tension thereto and thus generate a snapping action to throw particles from said filter sling over to said panel.

13. A machine as defined in claim 10, additionally including a conduit disposed to return excess liquid from said receptacle to said tank, said conduit communicating with said receptacle at a point adjacent the top thereof.

* * * * *